United States Patent
Okafuji et al.

(10) Patent No.: US 7,171,735 B2
(45) Date of Patent: Feb. 6, 2007

(54) SHAPE MEMBER MANUFACTURING APPARATUS AND SHAPE MEMBER MANUFACTURING METHOD

(75) Inventors: Osamu Okafuji, Kudamatsu (JP); Koji Hamada, Kudamatsu (JP); Takeshi Yano, Kudamatsu (JP); Kazushige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 141 days.

(21) Appl. No.: 11/074,685

(22) Filed: Mar. 9, 2005

(65) Prior Publication Data

US 2006/0059671 A1 Mar. 23, 2006

(30) Foreign Application Priority Data

Sep. 21, 2004 (JP) ............................. 2004-272721
Mar. 1, 2005 (JP) ............................. 2005-056092

(51) Int. Cl.
*B23P 23/00* (2006.01)
*B23C 3/12* (2006.01)

(52) U.S. Cl. ........................... 29/33 A; 29/56.5; 29/50; 29/55; 409/139; 409/212; 409/232; 409/180; 407/42; 407/30; 451/70; 30/373

(58) Field of Classification Search ................ 29/33 R, 29/564, 566, 50, 52–55, 56.5, 33 A; 409/138–140, 409/202, 212, 235, 232, 180; 407/30, 33–34, 407/42; 83/839, 853; 451/65, 69–70; 30/373–374
See application file for complete search history.

(56) References Cited

U.S. PATENT DOCUMENTS 3,612,030 A * 10/1971 Blum ............................. 125/1

4,193,719 A * 3/1980 Oaks ............................. 407/49

(Continued)

FOREIGN PATENT DOCUMENTS

DE 3337056 10/1985

(Continued)

*Primary Examiner*—Erica Cadugan
(74) *Attorney, Agent, or Firm*—Antonelli, Terry, Stout and Kraus, LLP.

(57) ABSTRACT

The invention provides a shape member manufacturing apparatus and a shape member manufacturing method which aims at cutting and grinding a joint projection 8B formed when a plurality of shape members are joined together by welding or friction stir welding, in a short time with high accuracy.

A plurality of mounts 11 having a side structure 8 placed thereon are arranged in the longitudinal direction of the side structure. A joint projection 8B of a welded portion or a friction stir welded joint is formed on the surface of the side structure 8 in its longitudinal direction. A carrier 100 travels in the longitudinal direction of the side structure 8. Columns 105 are installed in a girder 103 of the carrier, and a milling cutter device 80 and a grinding device 90 are installed in lower portions of the columns 105. A milling surface of a milling cutter 81 of the milling cutter device 80 has a circular-arc shape with a radius R. The milling cutter 81 performs cutting at an angle θ1 tilted with respect to a vertical line. Further, the milling cutter device is provided with sliding plates 85. The milling cutter device performs cutting with the sliding plates 85 brought into contact with the surfaces of the extruded shape members.

5 Claims, 8 Drawing Sheets

U.S. PATENT DOCUMENTS

| | | | |
|---|---|---|---|
| 4,222,298 A * | 9/1980 | James | 83/853 |
| 4,589,174 A * | 5/1986 | Allen | 29/33 R |
| 4,784,540 A * | 11/1988 | Underhaug | 409/140 |
| 4,848,205 A * | 7/1989 | Suzuki et al. | 83/853 |
| 5,174,700 A * | 12/1992 | Sgarbi et al. | 409/140 |
| 5,277,529 A * | 1/1994 | Anders et al. | 409/131 |
| 5,662,436 A * | 9/1997 | Bishop | 407/35 |
| 5,882,157 A * | 3/1999 | Buysman et al. | 409/139 |
| 6,086,294 A * | 7/2000 | Danchine et al. | 409/132 |
| 6,254,317 B1 * | 7/2001 | Chang | 408/1 R |
| 6,484,410 B1 * | 11/2002 | Meastas | 30/373 |
| 6,626,617 B2 * | 9/2003 | Lorber et al. | 409/132 |
| 2003/0029297 A1 * | 2/2003 | Haughton et al. | 83/853 |
| 2004/0194569 A1 * | 10/2004 | Hermoso | 74/490.01 |
| 2005/0288161 A1 * | 12/2005 | Toncelli | 483/31 |

FOREIGN PATENT DOCUMENTS

| | | |
|---|---|---|
| EP | 539633 A1 * | 5/1993 |
| EP | 1 057 575 | 12/2000 |
| JP | 54-032892 A * | 3/1979 |
| JP | 57-201121 A * | 12/1982 |
| JP | 11-090655 | 4/1999 |
| JP | 11-285829 | 10/1999 |
| JP | 2000-158310 | 6/2000 |
| SU | 1609555 | 11/1990 |

* cited by examiner

SHAPE MEMBER MANUFACTURING APPARATUS AND SHAPE MEMBER MANUFACTURING METHOD

The present application is based on and claims priority of Japanese patent applications No. 2004-272721 filed on Sep. 21, 2004, and No. 2005-056092 filed on Mar. 1, 2005, the entire contents of which are hereby incorporated by reference.

BACKGROUND OF THE INVENTION

1. Field of the Invention

The present invention relates to a shape member manufacturing apparatus and a shape member manufacturing method capable of removing a joint projection remaining on the surfaces of the shape members to manufacture the surfaces of the shape members smoothly when a plurality of shape members are joined together by welding, friction stir welding, and the like.

2. Description of the Related Art

The shape members to be manufactured by the shape member manufacturing apparatus include, for example, extruded shape members made of aluminum alloy (hereinafter simply referred to as extruded shape members). The extruded shape members include, for example, ones having a flat plate-shaped shape member or a hollow shape member with ribs. In addition, the shape member manufacturing apparatus is manufactured to have a structure, which is obtained by making flat plates abut on each other and joining them together by welding. There are a structural body of a railway car as such manufactured from the extruded shape members. The structural body of a railway car is constructed with an underframe, side structures, a roof structure, and end structures. The side structure is manufactured by arranging a plurality of extruded shape members with their extruded direction extending along the longitudinal direction of the side structure, and by arranging the extruded shape members in the widthwise direction of the side structure for joining them together. The plurality of extruded shape members arranged in the widthwise direction of the side structure are joined together by welding or friction stir welding of abutting portions thereof. The roof structure or the underframe is manufactured almost in the same way as the side structure. When the adjacent extruded shape members are welded to each other, MIG welding is generally adopted, and welding beads protruding from the surfaces of the extruded shape members are formed at joints. Further, when the adjacent extruded shape members are joined together by the friction stir welding, projections are previously formed on the surfaces of joints of the respective extruded shape members, and the projections of both the abutting shape members are joined together by a tool for friction stir welding. The projections of both the abutting shape members are partially cut away by the tool for friction stir welding. However, the surfaces of the extruded shape members immediately after the welding do not become smooth because uncut portions remain. In this way, when the plurality of extruded shape members are butt-joined together by welding, friction stir welding, and the like, the protruding joint projections remain on the surfaces of the extruded shape members. The joint projections of the surfaces of the extruded shape members are smoothly manufactured by a manual operation using a grinder.

The operation of smoothing the surfaces of the extruded shape members is troublesome because it is a manual operation using a grinder. Further, a conventional smoothing operation is an operation that require skills because grinding should be performed in consideration of finished surfaces of the extruded shape members. Further, since the conventional smoothing operation requires much time and chip cuts are produced, the operation environment is bad.

Separately from the operation of smoothing the surfaces of the extruded shape members, an example in which surface manufacturing is performed on a plate member by mechanical devices is known in the Japanese Patent Laid-open No. 2000-158310 (Patent Document 1). Patent Document 1 discloses a deburring machine which performs deburring of a hollow portion caused by a turret punch and the like. However, finishing the joint projection continuously formed on the surfaces of the above-mentioned extruded shape members efficiently in a short time is not considered in this deburring machine.

Meanwhile, Japanese Patent No. 3070735 (Patent Document 2) discloses an example in which, when a plurality of extruded shape members are joined together by friction stir welding, a rear portion of a tool for friction stir welding is provided with a cutting device which cuts a joint projection. In this cutting device, an end mill is illustrated as an example of a cutting tool. When the joint projection is cut using the end mill, it is difficult to perform cutting while the tip of the end mill is caused to move along the surfaces of the extruded shape members accurately. Specifically, the total length of the side structure constructed by joining the plurality of extruded shape members together is as long as about 17 m to 25 m, and the width thereof is about 3 m. When cutting manufacturing is performed with the side structure constrained, in order to maintain the surface of the side structure in a flat state, a constraint device with high accuracy is needed on a large scale. Further, in order to cause a cutting means, such as an end mill, which cuts a joint projection on the surface of the side structure, a complicated control mechanism is required to move to follow the surface of the side structure accurately. For this reason, when the joint projection of the side structure and the like is automatically cut, it should be manufactured, leaving a cutting stock for finishing in consideration of cutting accuracy. In addition, finishing manufacturing should be performed on the cutting stock remaining on the surfaces of the extruded shape members by a manual operation using a grinder as previously mentioned.

SUMMARY OF THE INVENTION

The object of the present invention is to cut a joint projection formed on surfaces of extruded shape members by welding, friction stir welding, and the like, in a short time with high accuracy.

The object of the present invention can be achieved by a shape member manufacturing apparatus comprising a carrier movable along a joint projection of shape members and a milling cutter device installed on the carrier for cutting the joint projection of the shape members, wherein a milling cutter of the milling cutter device is formed so as to be away from surfaces of the shape members, as its milling surface approaches ends of the milling cutter in the direction of its rotation axis, and the milling cutter device is installed on the carrier to be movable in the axial direction of the milling cutter.

Further, the object of the present invention can be achieved by a shape member manufacturing method comprising the steps of constraining and positioning the shape members where joint projection is continuously formed in a longitudinal direction of the shape members on a surface of a joint obtained by joining a plurality of the shape members together, disposing a milling cutter device comprising a curved milling surface having its widthwise central portion bulged toward the shape members so as to cut the joint projection of the shape members, cutting the joint projection in the longitudinal direction of the shape members in a state in which the widthwise central portion of the milling surface of the milling cutter is caused to conform to one widthwise end of the joint projection, and cutting the joint projection in the longitudinal direction of the shape members in a state in which the widthwise central portion of the milling surface of the milling cutter is caused to conform to the other widthwise end of the joint projection.

DETAILED DESCRIPTION OF THE PREFERRED EMBODIMENTS

Figure 1:
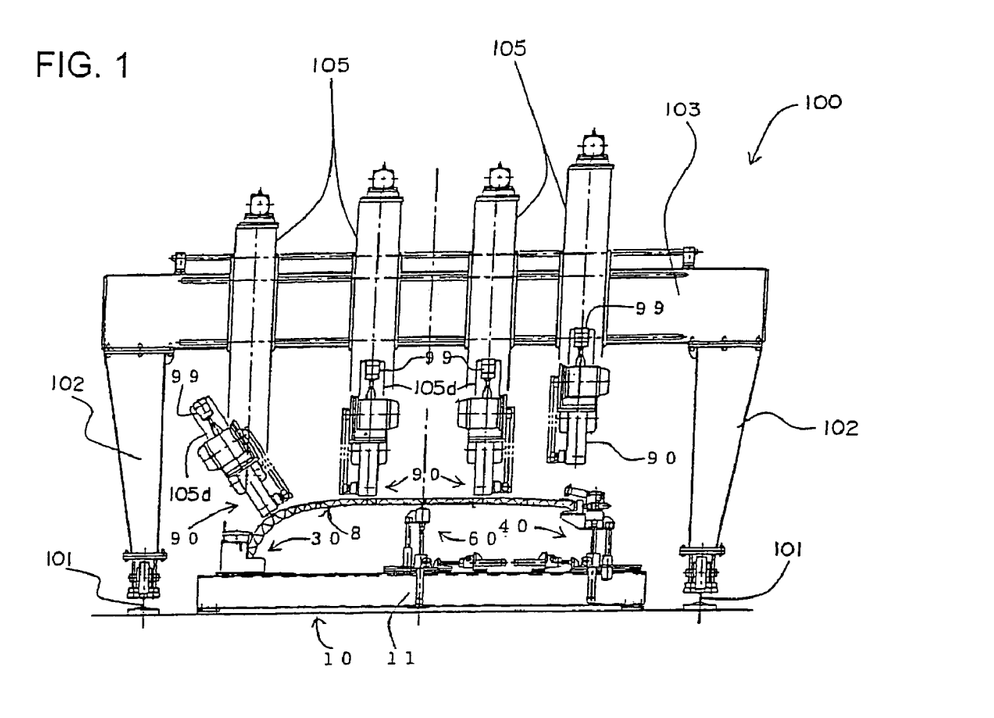
FIG. 1 is a front view showing an embodiment of a shape member manufacturing apparatus of the present invention.
Figure 2:
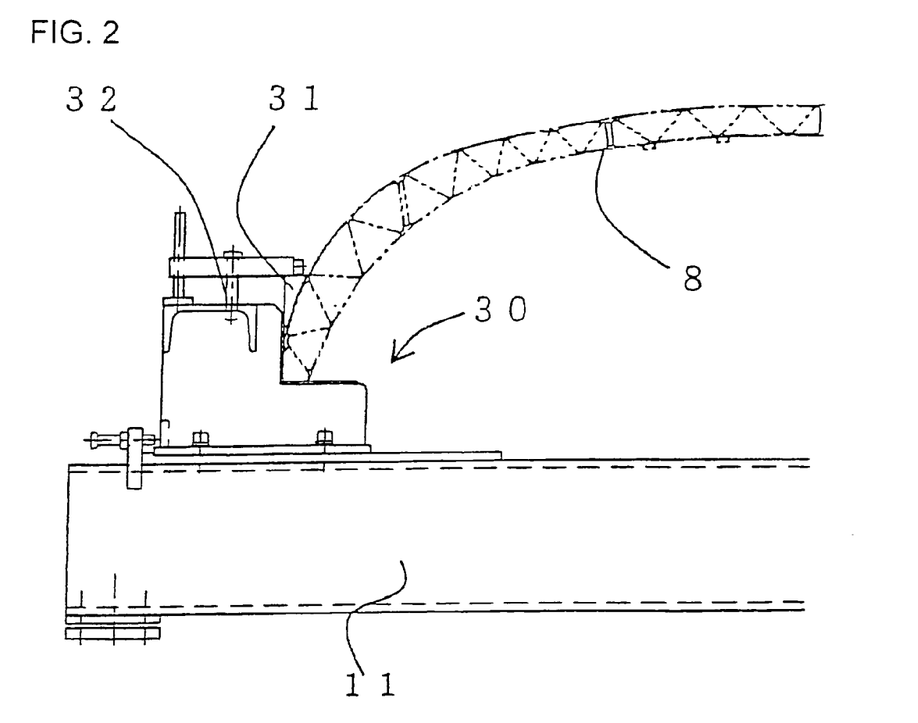
FIG. 2 is an enlarged front view of a support 30 of FIG. 1.
Figure 3:
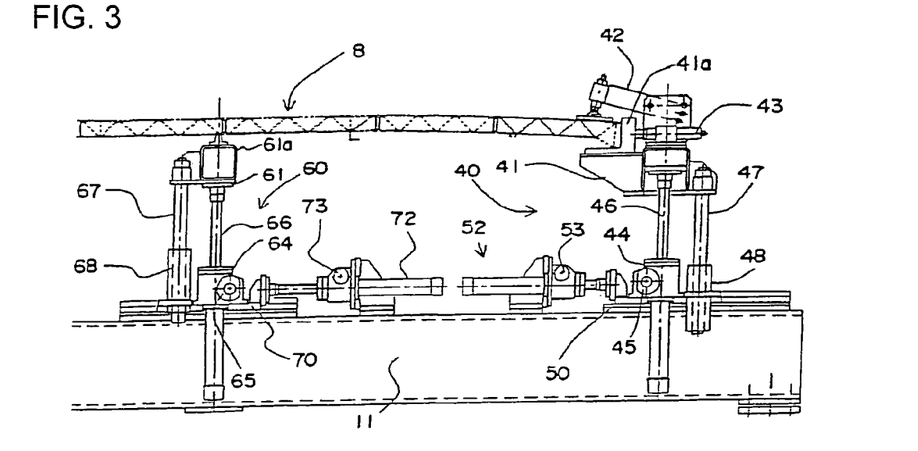
FIG. 3 is an enlarged front view of a support 40 and a support 60 of FIG. 1.
Figure 4:
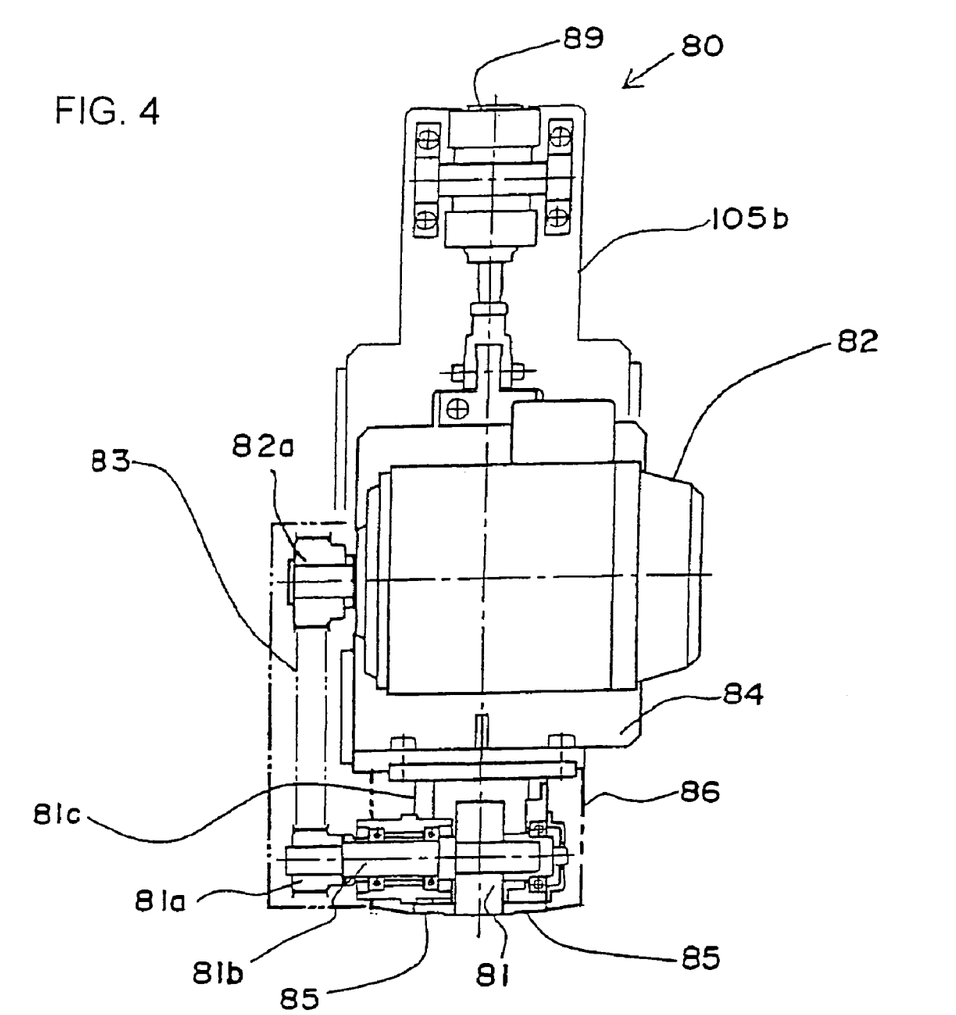
FIG. 4 is a front view of a milling cutter device 80.
Figure 5:
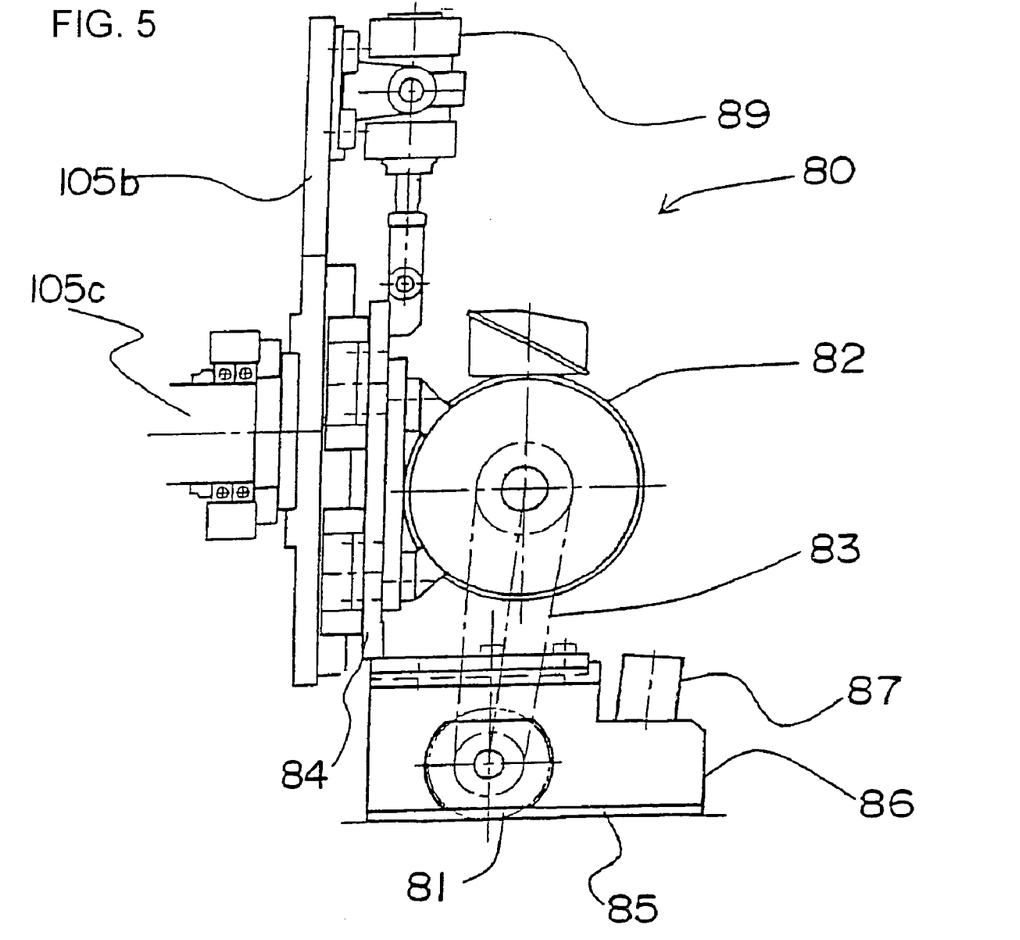
FIG. 5 is a side view of the milling cutter device 80.
Figure 6:
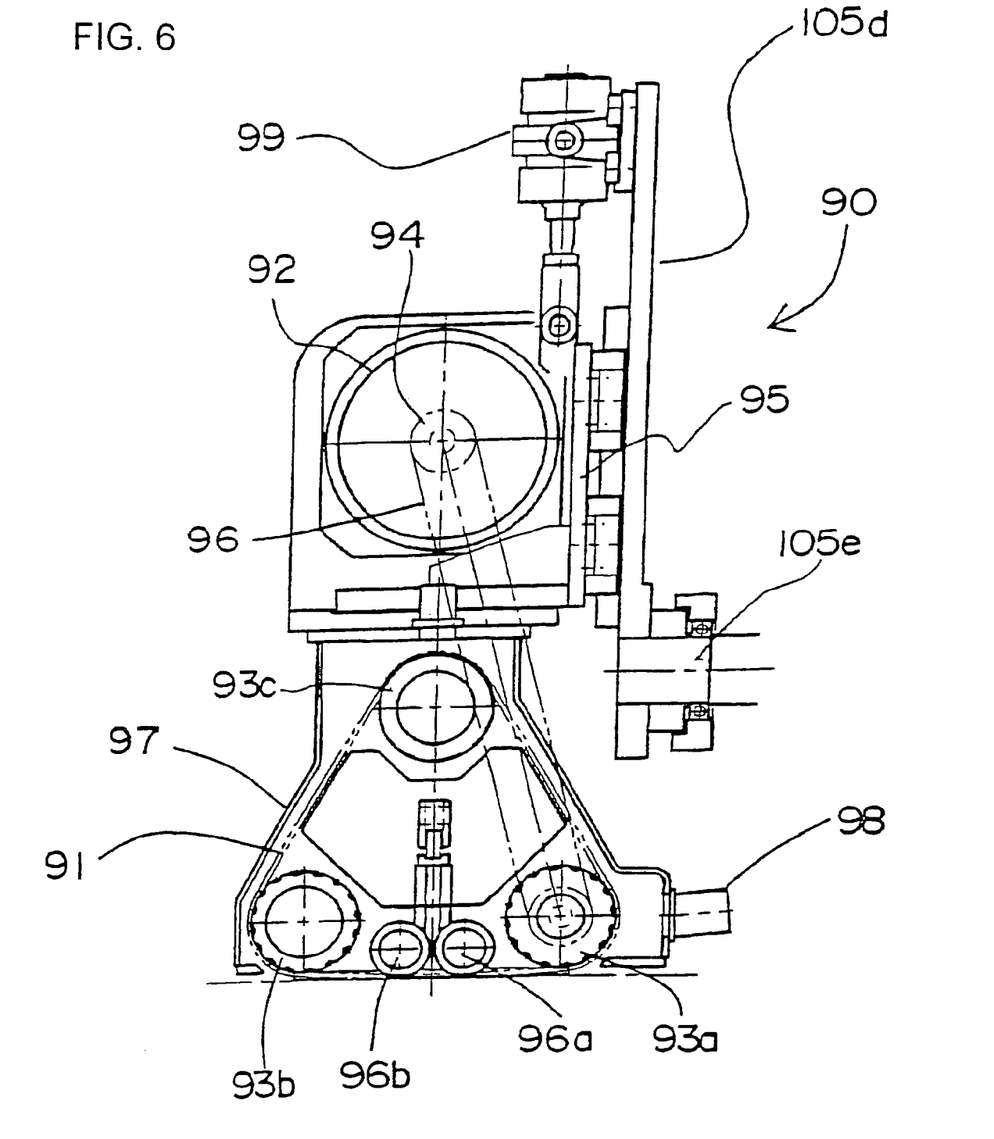
FIG. 6 is a side view of a grinding device 90.
Figure 7:
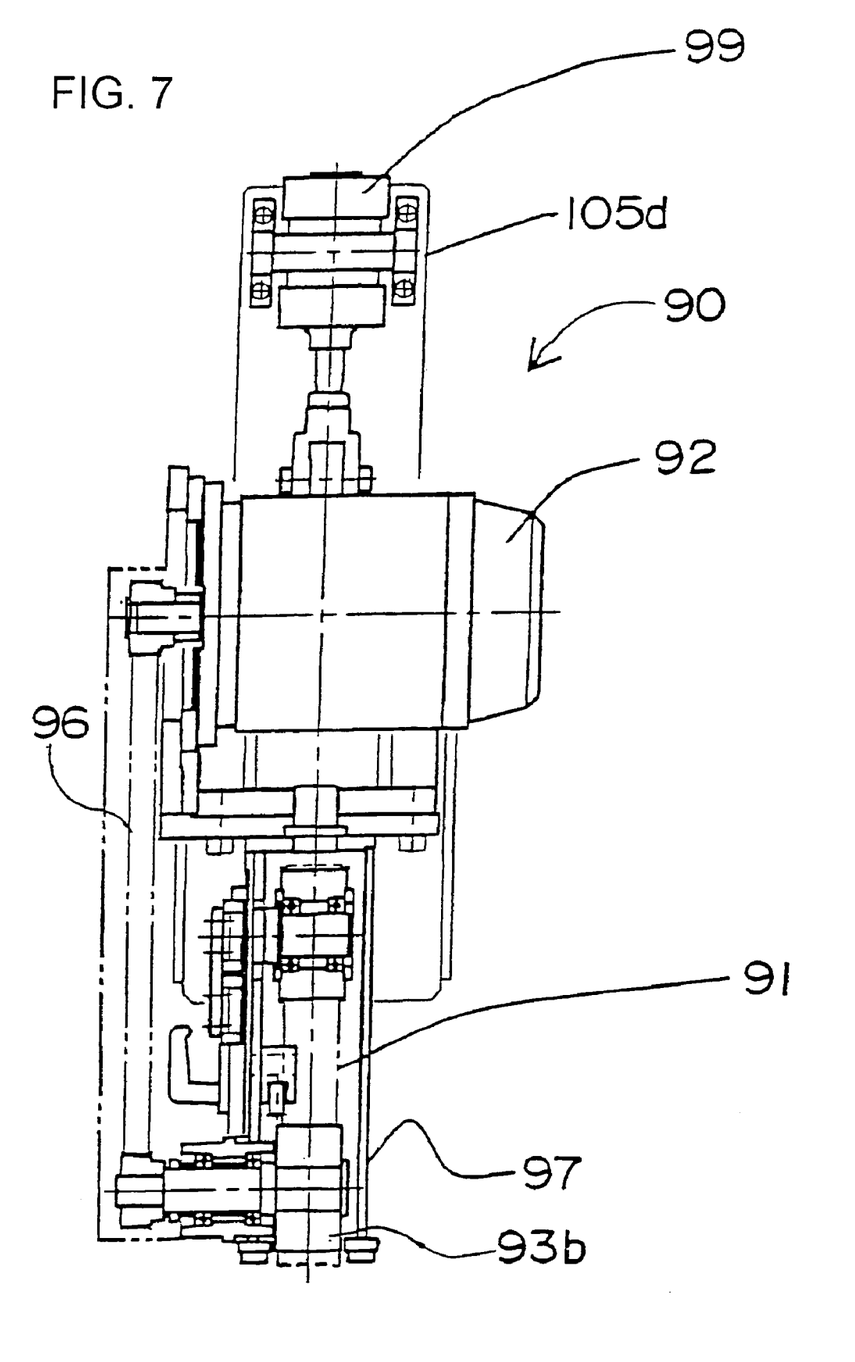
FIG. 7 is a front view of the grinding device 90.
Figure 8:
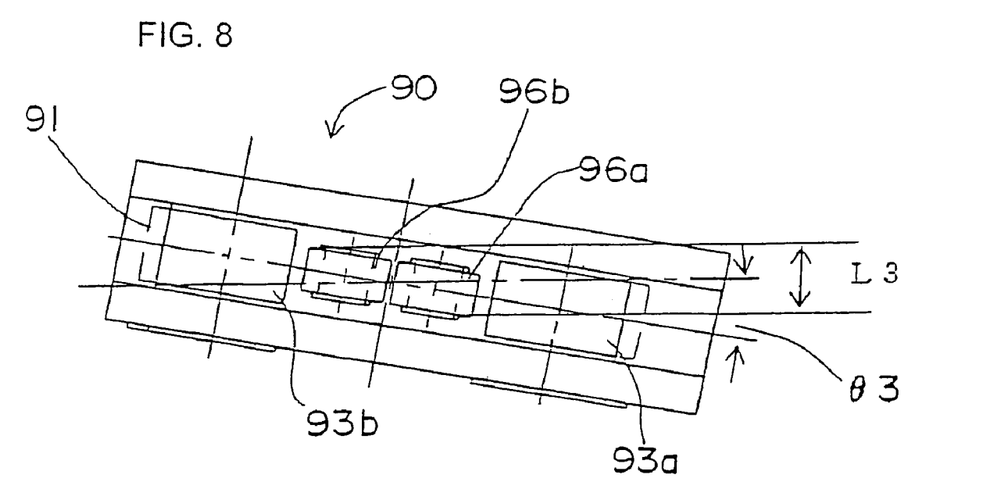
FIG. 8 is an explanatory view showing a grinding surface of a grinding belt.
Figure 9:
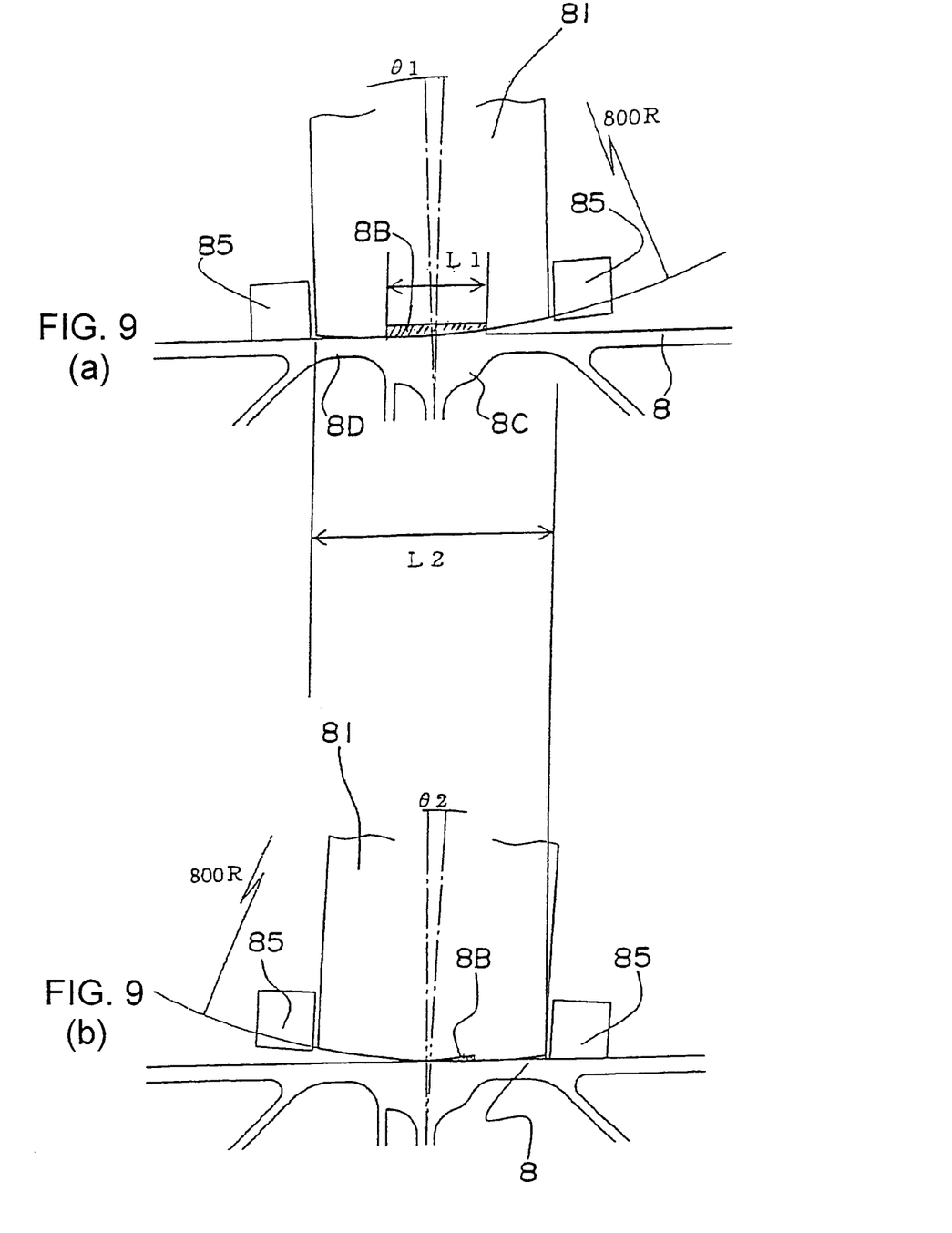
FIG. 9 is an explanatory view showing a cutting situation of a milling cutter 81.

Hereinafter, the present invention will be described with reference to FIG. 1 to FIG. 9. FIG. 1 is a front view showing an embodiment of a shape member manufacturing apparatus according to the present invention. FIG. 2 and FIG. 3 are front views showing a situation in which a side structure is positioned and constrained by a shape member manufacturing apparatus shown in FIG. 1 while it is manufactured. FIG. 4 and FIG. 5 are explanatory views of a driving part of a milling cutter device. FIGS. 6 to 8 are explanatory views of a grinding device. FIG. 9 is an explanatory view showing a detailed structure of a milling cutter of the milling cutter device.

In FIG. 1, a side structure 8 is placed and constrained on the shape member manufacturing apparatus with the outer surface of the car upward. A plurality of mounts 11 are installed on a bed 10 at predetermined intervals (for example, an interval of about 1 m to 2 m) in a longitudinal direction of the side structure 8 (hereinafter referred to as an X-axis direction). Each mount 11 is disposed so that its longitudinal direction directs toward a widthwise direction of the side structure 8 (hereinafter referred to as a Y-axis direction). The total length of each mount 11 is set to be longer than the width dimension of the side structure 8. A support 30, a support 40 and a support 60 are attached on an upper surface of each mount 11. When the side structure 8 is seen from the X-axis direction, it has a curved shape bulged upward. In FIG. 1, a left end of the side structure 8, that is, an upper portion connected to a roof structure when a car body is constructed is supported by the support 30. A right end of the side structure 8, that is, a lower portion connected to an underframe when a car body is constructed is supported by the support 40. The side structure 8 has its central portion in the Y-axis direction supported by the support 60. The support 30, the support 40, and the support 60, which are installed on each of the plurality of mounts 11, support the own weight of the side structure 8 and manufacturing load for manufacturing the surface of the side structure.

As shown in FIG. 2, the upper portion of the side structure 8 has a shape which is curved inwardly in the widthwise direction of the car body. The support 30 comprises a pushing jig 31 having a curved supporting surface that conforms to the curved outer surface of the car of the upper side of the side structure 8. With the curved supporting surface of the pushing jig 31 pushed against the outer surface of the car of the side structure 8, the pushing jig 31 is fixed to the support 30 by a fixing jig 32. The pushing jig 31 pushes the side structure 8 against a horizontal supporting surface of the support 30, and pushes the side structure 8 toward the support 40. The support 30 is fixed to the mount 11 with a fixing means, such as bolts. The curved supporting surface of the pushing jig 31 has a shape which conforms to the shape of the outer surface of the car, for example, of the side structure, the roof structure, or the like, as members to be constrained. A backing plate such as an aluminum alloy plate is installed between the supporting surface of the support 30 and the side structure 8. The backing plate is installed for preventing the side structure 8 from being scratched.

The support 40 comprises a supporting jig 41a having an L-shaped supporting surface which supports the lower portion of the side structure 8. The supporting jig 41a is put on a rest 41. The supporting jig 41a moves so as to be capable of advancing or retreating in the Y-axis direction on the rest 41 by a pusher 43. The supporting jig 41a is made of an aluminum alloy, and is disposed so as not to scratch the side structure 8. The supporting jig 41a bears the side structure 8 which has been pushed toward the support 40 by the pushing jig 31. The pushing jig 31 and the supporting jig 41a perform the positioning of the side structure 8 in the Y-axis direction. The side structure 8 is pushed against the supporting jig 41a by a holddown link 42 from above. The holddown link 42 is installed on the rest 41. The rest 41 is supported to move up and down by means of a screw jack 44. The height of the rest 41 is adjusted by the screw jack 44. The screw jack 44 comprises a vertically arranged screw rod 46, and the rest 41 is installed on an upper end of the screw rod 46. The screw jack 44 is installed in each of the plurality of mounts 11. The screw jacks 44 installed in the respective mounts 11 are connected to each other by a coupling shaft 45. As the coupling shaft 45 is driven, the respective screw jacks 44 interlock with each other to adjust the height of the respective rests 41. A worm gear is installed in the coupling shaft 45, and engages with a worm wheel that constitutes the screw jack 44. A screw rod 46 is screwed to the worm wheel. Accordingly, when the coupling shaft 45 is rotated, the worm gear rotates the worm wheel to raise or lower the screw rod 46. The coupling shaft 45 is installed substantially over the entire length of the bed 10. An electric motor that drives the coupling shaft 45 is installed adjacent to the screw jack substantially at a central position of the bed 10 in the X-axis direction.

A guide rod 47 is installed parallel to the screw rod 46, and the rest 41 is fixed to an upper end of the guide rod 47. The guide rod 47 is supported to be slidable up and down by a guide 48, and has a function to guide the screw rod 46 vertically.

The screw jack 44 and the guide 48 are installed on a movable carriage 50 and constitute the support 40. The movable carriage 50 is installed to be movable in the Y-axis direction on the mount 11. An extension/retraction device 52 moves the movable carriage 50 in the Y-axis direction, and adjusts the position of the support 40 according to the width dimension of the side structure 8. The extension/retraction device 52 has a screw jack built therein, and is installed on each of the plurality of mounts 11. Each extension/retraction device 52 installed on each of the mounts 11 is coupled with an interlocking shaft 53. As the interlocking shaft 53 is driven, similar to the screw jack 44, the respective extension/retraction devices 52 interlock with each other to adjust the positions of the respective supports 40 in the Y-axis direction.

The support 60 is installed on each of the plurality of mounts 11, and supports the side structure 8 from the inside of a car. The support 60 is installed between the support 30 and the support 40. The basic structure of the support 60 is similar to the support 40, and a supporting jig 61a is installed on a rest 61. In the side structure 8, joints of a plurality of extruded shape members have higher strength than the other portions. The supporting jig 61a supports the joints of the plurality of extruded proportions that constitutes the side structure 8 from the inside of a car. The rest 61 is supported to be movable up and down by a screw rod 66 and a guide rod 67. The screw rod 66 constitutes the screw jack 64. The screw jack 64 is coupled with another jack 64 of an adjacent support 60 by a coupling shaft 65. The guide rod 67 is supported to be slidable up and down by a guide 68, and has a function to guide the screw rod 66 vertically. The screw jack 64 and the guide 68 are installed on a movable carriage 70, and constitute the supports 60. The movable carriage 70 is installed to be moveable on the mount 11 in the Y-axis direction. The position of the movable carriage 70 in the Y-axis direction is adjusted by means of an extension/retraction device 72 having a screw jack built therein. The extension/retraction device 72 is coupled with the extension/retraction device 72 of an adjacent movable carriage 70 by an interlocking shaft 73.

Next, a manufacturing means that performs cutting and grinding of the outer surface of the car of the side structure 8 will be described. In FIG. 1, rails 101 are respectively installed along the X-axis direction on an upper surface of the bed 10 at both side positions of each mount 11 in its longitudinal direction, that is, in the Y-axis direction. A carrier 100 travels on the two rails 101 in the X-axis direction. The carrier 100 is composed of two legs 102 installed on both sides in the Y-axis direction and a girder 103 that connects the two legs 102 with each other. The longitudinal direction of the girder 103 is disposed along the Y-axis direction. Four columns 105 are installed in the guider 103, and the columns 105 are installed to be movable in the Y-axis direction with respect to the girder 103. A milling cutter device 80 and a grinding device 90 are respectively installed in each column 105. Each column 105 is disposed in the Y-axis direction of each girder 103 so as to conform to the joining positions between extruded shape members of a workpiece, for example, the side structure 8, which is constrained on the mount 11. Each column 105 is installed so that it can ascend or descend with respect to the girder 103. The milling cutter device 80 and the grinding device 90 are installed at the lower end of the respective column 105. When the milling cutter device 80 and the grinding device 90 manufacture the outer surface of the car of the side structure 8, the respective column 105 is positioned at optimal positions. The milling cutter device 80 and the grinding device 90, which are set in the respective column 105, are juxtaposed to each other in the X-axis direction, and are disposed along joining lines between the extruded shape members of the side structure 8. The milling cutter device 80 and the grinding device 90 are installed to be rotatable about the vertical axis of the column 105. Accordingly, the arrangement of the milling cutter device 80 and the grinding device 90 can be switched according to the situation of movement of the carrier 100 in the X-axis direction. The position adjustment of each column 105 in the Y-axis direction is performed by automatic control such that a joint projection of the side structure is detected using an optical sensor, and the manufacturing positions of the milling cutter device 80 and the grinding device 90, which will be described later, are caused to conform to the joint projection.

In addition, the joint projections of the side structure 8 constructed by extruded shape members are located at predetermined positions in the Y-axis direction and extend continuously in the X-axis direction. Accordingly, the position adjustment of each column 105 in the Y-axis direction may be manually performed without using the optical sensor. Otherwise, position data about the joint projection of the side structure 8 in the Y-axis direction may be stored in advance in a control device, and the position adjustment of each column 105 in the Y-axis direction may be performed on the basis of the position data.

Further, the milling cutter device 80 and the grinding device 90 are supported by tilt columns 105b and 105d which are installed such that they can be tilted about the X-axis as its rotation center with respect to each column 105. The upper portion, that is, the left portion of FIG. 1 of the side structure 8 has a shape which is curved toward the center of a car, and a support structure which can make the milling surface of the milling cutter device 80 and the grinding surface of the grinding device 90 conform to each other.

In the present embodiment, the four columns 105 are installed in the Y-axis direction, but they may be installed in accordance with joining spots of the side structure 8 as a workpiece; The number of columns 105 to be installed is not limited to the present embodiment.

Next, a detailed structure of the milling cutter device 80 will be described. As shown in FIG. 4 and FIG. 5, the milling cutter device 80 is installed in the tilt column 105b so that the tilt of its milling surface can be varied according to that of the surface of a workpiece. The tilt column 105b is supported by a tilt rotation shaft 105c whose rotation center is disposed in the X-axis direction. The milling cutter device 80 mainly comprises a milling cutter 81, an electric motor 82 which drives the milling cutter 81, and a cylinder unit 89 which adjusts the height of the milling cutter 81. A pulley 81a is installed at one end of the rotating shaft 81b which supports the milling cutter 81. A timing belt 83 is installed between a pulley 82a installed on the rotating shaft of the electric motor 82 and the pulley 81a. The rotating shaft 81b and the electric motor 82 are installed in the slide frame 84. The slide frame 84 is installed to be slidable up and down with respect to the tilt column 105b. The cylinder unit 89 is installed in the upper portion of the tilt column 105b, and the slide frame 84 is attached to a tip of a telescopic shaft of the cylinder unit 89. The cylinder unit 89 moves the slide frame 84 up and down, to adjust the position of the milling cutter 81 with respect to the side structure 8 as a workpiece. The milling cutter 81 is pushed against a workpiece to perform cutting, according to weights of respective members installed on the slide frame 84. At this time, the adjustment of a pushing force of the milling cutter 81 can be performed by adjusting the pressure of a compressed air supplied to the cylinder unit 89.

A support arm 81c that supports the rotating shaft 81b providing the support of the milling cutter 81 is installed at a lower end of the slide frame 84. Sliding plates 85 are respectively installed on axially lateral sides of the milling cutter 81 on a bottom surface of the support arm 81c. Each sliding plate 85 has a predetermined length in the X-axis direction. When the surface of the side structure 8 is cut using the milling cutter 81, the sliding plate 85 keeps the gap between the milling cutter 81 and a manufacturing surface constant. Further, a dust-collecting cover 97 is installed in the support arm 81c for covering the surroundings of the milling cutter 81. The dust-collecting cover 97 is provided with a connecting barrel 86 connected to a dust-collecting duct. Chips that are produced when the milling cutter 81 cuts joint projection on the surface of the side structure 8 is sucked by a dust collector installed in the dust-collecting duct.

Next, the relationship between the milling cutter 81 and the side structure 8 as a workpiece will be described with reference to FIGS. 9A and 9B. An example of the side structure 8 shown in FIG. 9 is a joint obtained by joining two extruded shape members 8C and 8D together through friction stir welding. A joint projection 8B is formed at an abutting portion of the two protruded shape members 8C and 8D on the car body surface. The joint projection 8B, as shown in FIG. 9A, remains after joined. In addition, the surfaces of the extruded shape members 8C and 8D shown in FIG. 9 in the Y-axis direction are substantially flatly formed except for the joint projection.

FIGS. 9A and 9B show a state of the milling cutter 81 as seen from the X-axis direction. The milling surface of the milling cutter 81 that performs cutting is formed in a circular-arc shape, and the center of the circular arc is located at the central position of the milling cutter 81 in its widthwise direction, that is, in the Y-axis direction. The radius of the circular arc is, for example, about 800 mm. Accordingly, the widthwise both side portions of the milling surface of the milling cutter 81 have a smaller diameter than the central portion. The rotation axis of the milling cutter 81 can be tilted at an angle of θ1 (+0.3°) or θ2 (−0.3°) with respect to the surface of the side structure 8. That is, the milling cutter device 80 is tilted and the milling surface of the milling cutter 81 is tilted by rotating the tilt column 105b with respect to the tilt rotation shaft 105c. This tilt angle is determined depending on the magnitude of the radius of the circular arc of the milling surface. The tilt center in the case of tilting the milling cutter 81 is on the side of the extruded shape members 8C or 8D. Therefore, the milling cutter 81 is tilted at the angle of θ1 or θ2, to thereby move the position where the milling cutter 81 performs cutting in the Y-axis direction.

The sliding plates 85 each are installed at the both side positions of the milling cutter 81 in the Y-axis direction. When the milling cutter 81 is tilted, one sliding plate 85 is disposed in contact with the extruded shape members 8C or 8D. For example, as shown in FIG. 9A, when the milling cutter 81 is tilted at the angle of θ1 toward the extruded shape member 8D, the left sliding plate 85 in the figure makes contact with the surface of the extruded shape member 8D to maintain the distance between the milling surface and the extruded shape member. As shown in FIG. 9B, when the milling cutter 81 is tilted at the angle of θ2 toward the extruded shape member 8C, the opposite sliding plate 85 is disposed in contact with the extruded shape member 8C. Then, the milling cutter cuts uncut portions remaining after the cutting operation in FIG. 9A. Accordingly, the contact surfaces of the two sliding plates 85 with extruded shape members are tilted with respect to the centerline of rotation of the milling cutter 81. Further, while the milling cutter 81 cuts the joint projection 8B, each of the sliding plates 85 is disposed to make contact with the surface of the extruded shape member to keep the cutting depth of the milling cutter 81 constant. Each of the sliding plates 85 prevents the milling cutter 81 from excessively deeply cutting the joint projection of the extruded shape members 8C and 8D.

The width of the milling cutter 81 is set to be slightly wider than a width dimension L1 of the joint projection. A small gap is provided between the milling cutter 81 and each of the sliding plates 85. The width of the milling cutter is arranged to be a little wider than that of the joint projection. As shown in FIGS. 9A and 9B, since cutting is performed in a tilted state, the entire joint projection cannot be cut in one cutting process. Accordingly, the milling cutter 81 reciprocates in the X-axis direction on the joint projection, thereby cutting the entire joint projection. In the state shown in FIG. 9A, up-cutting of the milling cutter 81 is performed because a portion of the joint projection to be cut is large. In the state shown in FIG. 9B, down-cutting of the milling cutter 81 is performed because an uncut portion of the joint projection is small, and the moving speed of the milling cutter in the X-axis direction is increased. In this manner, the milling cutter 81 is reciprocated once in the X-axis direction to cut the joint projection, but in the state shown in FIG. 9B, the moving speed of the milling cutter in the X-axis direction is increased to shorten the cutting time.

Meanwhile, although the milling cutter 81 has been described in relation to an example in which the surface of the extruded shape member 8C or 8D is substantially flatly formed, the car body surface of the side structure 8 in the Y-axis cross shape member also has a portion which forms a curved surface protruding toward the outer side of the car. At a joint between extruded shape members that form the curved surface in this manner, a milling surface of a milling cutter may be formed parallel to its rotation axis. In this case, similarly, the milling cutter is tilted (at an angle of θ1 or θ2) to perform cutting. Further, the milling cutter 81 has one circular arc as the shape of its milling surface. However, it can also be contemplated that a widthwise central portion of a milling cutter is formed in a predetermined radius of a circular arc, and that its widthwise both ends are formed in a circular arc having a smaller radius than the central portion.

As described above, the milling surface of the milling cutter 81 is configured to be gradually away from the surfaces of the extruded shape members to be cut, as it goes toward both sides in the Y-axis direction relative to the surfaces of the extruded shape members. Therefore, on the milling surface of the milling cutter 81, the widthwise (Y-axis-direction) central portion of the milling cutter 81 deeply cuts the surfaces of the extruded shape members. Accordingly, as mentioned above, cutting is performed while the milling cutter 81 is tilted, each of the sliding plates 85 installed on the both sides of the milling cutter 81 is brought into contact with the extruded shape member 8C or 8D, and the distance between the milling cutter 81 and each of extruded shape members 8C and 8D is kept constant. This can prevent the milling cutter 81 from excessively deeply cutting the surfaces of the extruded shape members 8C and 8D. The joint projection can be cut with the sliding plate 85 brought into contact with the extruded shape member, to thereby cut the surfaces of the extruded shape members with high accuracy. Further, in the above cutting, any failure does not occur even if the cutting operation is automated because cutting is performed so that the sliding plates 85 make a milling cutter follow the surfaces of the extruded shape members. The automation of cutting operation makes it possible to perform cutting efficiently in a short time as compared to a manual operation.

Meanwhile, as mentioned above, the milling cutter can be moved in the Y-axis direction to cut the surfaces of the extruded shape members without being tilted, as long as the milling cutter can be moved in the X-axis direction along the surfaces of the extruded surfaces without using the sliding plates 85. For example, a contact sensor or a non-contact sensor using light is installed in the vicinity of the milling cutter for detecting the deflection of the surfaces of the extruded shape members. The amount of the deflection of the surfaces of the extruded shape members detected by the sensor is adopted as input values for controlling the vertical movement of the milling cutter, to move the milling cutter along the surfaces of the extruded shape members. The milling surface of the milling cutter is formed in such a shape that its widthwise central portion is bulged further toward the surfaces of the extruded shape members than the widthwise both side portions. The central portion and both side portions of the milling surface are formed in a shape connected by a smooth curved surface. Accordingly, when the joint projection of the surfaces of the extruded shape members is cut, cutting is performed with the widthwise central portion of the milling cutter conformed to one end portion of the joint projection in the Y-axis direction. At this time, since uncut portions remain at the other end portion of the joint projection in the Y-axis direction, cutting is performed with the widthwise central portion of the milling cutter conformed to the other end portion of the joint projection. In this way, the milling cutter is moved in the Y-axis direction in response to the width of the joint projection, thereby cutting the joint projection of the surfaces of the extruded shape members. In this case, any groove or depression does not remain because the opposite ends of the joint projection in the Y-axis direction can be completely cut by the widthwise central portion of the milling cutter. Further, any seemingly noticeable groove or bump is not produced on the surface of a cut portion because the widthwise both end portions of the milling surface of the milling cutter gradually retreat relative to the surfaces of the extruded shape members. Accordingly, cutting can be performed using such a milling cutter, thereby manufacturing the surfaces of extruded shape members while improving the appearance thereof.

Next, the detailed structure of the grinding device 90 will be described with reference to FIG. 6 and FIG. 7. The grinding device 90 is a belt-type grinding device that uses a grinding belt 91. The grinding device 90 mainly comprises the grinding belt 91, an electric motor 92, and a plurality of pulleys. The main parts including the electric motor 92 are attached to a slide frame 95. The slide frame 95 is attached so as to be slidable up and down with respect to a tilt column 105*d*. A cylinder unit 99 is installed at an upper end of the tilt column 105*d*, and the slide frame 95 is attached to a tip of a telescopic shaft of the cylinder unit 99. The cylinder unit 99 moves the slide frame 95 up and down, to thereby adjust the position of a grinding surface of the grinding belt 91 with respect to the side structure 8 as a workpiece. The grinding belt 91 that is an endless belt is rotatably supported by pulleys 93*a*, 93*b*, and 93*c* which are arranged in a triangular shape as seen from the Y-axis direction. The pulley 93*a* is provided with a driving pulley for receiving power from the electric motor 92. A timing belt 96 for transmitting a driving force is hung between the driving pulley and the pulley 94 installed in the electric motor 92. In the grinding belt 91, a base of a triangle that is formed by the three pulleys is tensioned by the pulley 93*a* and the pulley 93*b*, thereby forming a flat grinding surface. The grinding surface extends toward X axis of the side structure 8 at an angle to be described later. Holddown pulleys 96*a* and 96*b* are installed between the pulley 93*a* and the pulley 93*b* to push the grinding belt 91 against a manufactured surface of the side structure 8 as a workpiece. A dust-collecting cover 97 is installed around an outer peripheral portion of the grinding belt 91. The dust-collecting cover 97 is provided with a connecting barrel 98 for connection to a dust collector and a dust-collecting duct.

Next, the situation of the grinding surface of the grinding belt 91 in the grinding device 90 will be described with reference to FIG. 8. In FIG. 8, as mentioned above, the grinding belt 91 is stretched by the pulley 93*a* and the pulley 93*b*. The grinding belt 91 stretched by the two pulleys is installed to extend at a tilt angle θ3 (about 10°). A portion of the grinding belt 91 that is pushed against the side structure 8 by the holddown pulleys 96*a* and 96*b* constitutes a grinding surface. The width of the grinding surface is L3 and slightly wider than the width of a workpiece to be cut by the milling cutter device 80. Further, the width L3 of the grinding surface is set to be wider than the width L1 of the joint projection 8B of the side structure 8.

Next, the manufacturing situation of the side structure 8 by means of the shape member manufacturing machine will be described. First, as shown in FIG. 1 to FIG. 3, the side structure 8 is positioned and constrained on the supports 30, 40, and 60 of each mount 11. Next, the carrier 100 is disposed at an end portion of the side structure 8 in the X-axis direction, and each of the columns 105 is arranged to correspond to each joint of respective extruded shape members. At this time, the tilt of the tilt column 105*b* of each column 105 is adjusted, to thereby dispose the milling surface of the milling cutter 81 so as to be tilted at the angle θ1 with respect to the joint projection 8B of the surfaces of the extruded shape members. In this state, the milling cutter 81 is lowered by the cylinder unit 89 while the milling cutter 81 is rotated, thereby starting cutting the joint projection 8B. When one sliding plate 85 makes contact with the surface of the extruded shape member, the descent of the milling cutter 81 stops, the carrier 100 is moved in the X-axis direction, and then the joint projection 8B of the surface of the side structure 8 is cut.

The milling surface of the milling cutter 81 is formed in a circular arc, and the milling cutter performs cutting while being tilted by the angle θ1 with respect to the surfaces of the extruded shape members. Therefore, the cutting width of the milling cutter 81 is slightly narrower than the width L1 of the joint projection. Accordingly, as shown in FIG. 9A, the milling cutter 81 is pulled over to one side (left side in the figure) of the joint projection 8B, and a left portion of the joint projection 8B is mainly cut. In this state, the carrier 100 travels in the X-axis direction from one end of the side structure 8 toward the other end thereof. At this time, the milling cutter 81 cuts the joint projection through up-cutting. When the carrier 100 has reached the other end of the side structure 8, the milling cutter 81 is tilted by the angle θ2 to the opposite side. Moreover, with the cutting position of the milling cutter 81 conformed to a right end of the joint projection 8B, the carrier 100 is moved in the direction reverse to the previous process, and then the remaining portion of the joint projection 8B is cut. At this time, the sliding plate 85 located on the right side of the milling cutter 81 makes contact with the surface of the extruded shape member, to keep the spacing between the milling cutter 81 and the extruded shape member. Then, the milling cutter 81 cuts the right portion of the joint projection 8B through down-cutting. When the carrier 100 has reached one end of the side structure 8, the cutting of the joint projection 8B is completed.

Next, the grinding device 90 is positioned in a grindable state at a portion of the joint projection 8B for which cutting has been completed. Then, while the grinding belt 91 is rotated and grinded by pushing its grinding surface against the surfaces of the extruded shape members, the carrier 100 is moved from one end of the side structure 8 toward the other end thereof to perform grinding. At a point of time when the carrier 100 has reached the other end of the side structure 8, the joint projection is flatly manufactured with improved appearance.

In this manner, the shape member manufacturing apparatus cuts and grinds the joint projection of the side structure 8. Since the milling surface of the milling cutter 81 is formed in a circular arc, the radius of the widthwise both ends of the milling surface is formed to be smaller than that of the widthwise central portion. Therefore, a noticeable groove is not formed on the surface of a workpiece because the surface of the workpiece is not cut by the widthwise ends of the milling surface of the milling cutter 81 during its normal cutting operation. Accordingly, when the milling cutter 81 cuts a joint projection, the appearance of the surfaces of the extruded shape members can be improved.

Since the milling cutter 81 removes the joint projection 8B at the abutting portion of the two extruded shape members through two cutting processes, both side corners of the joint projection 8B in the Y-axis direction can be completely removed.

Meanwhile, the milling cutter 81 is an example which performs cutting manufacturing in the case in which the surfaces of the respective extruded shape members 8C and 8D of the side structure 8 as a workpiece have a flat shape. A milling cutter installed in the leftmost column 105 shown in FIG. 1 has a flat milling surface, that is, a milling surface parallel to the rotation axis of the milling cutter. The extruded shape members constituting the side structure 8 to be cut by the milling cutter have a shape sectional shape in the Y-axis direction that is formed in a shape of a curved surface protruding toward the outer side of the car. Accordingly, even if the milling surface of the milling cutter is flat, the widthwise both ends of the milling surface are located at positions relatively away from the surfaces of the extruded shape member than the widthwise central portion. Therefore, the corners at the widthwise ends of the milling surface do not cut the surfaces of the extruded shape members. When a outer surface of the car of a side structure 8 has a sectional shape which is curved toward the outer side of the car, the appearance of the surfaces of the extruded shape members can be prevented from deteriorating, even if the milling surface of the milling cutter has a flat shape.

The joint projection of the plurality of extruded shape members constituting the side structure 8 extends in the X-axis direction. The grinding device 90 performs grinding with the longitudinal direction of the grinding surface of the grinding belt 91 tilted by the angle θ3 with respect to the X-axis direction. Accordingly, the grinding surface is not partially worn due to the shape of the joint projection because the grinding surface of the grinding belt 91 performs grinding while moving in a tilted direction. Since the grinding surface of the grinding belt 91 is not partially worn, the surfaces of the extruded shape members can be grounded evenly. Therefore, the appearance of the surfaces of the extruded shape members can be improved.

As described above, the surfaces of the extruded shape members can be manufactured smoothly by cutting and grinding the joint projection of the extruded shape members using the milling cutter device and grinding device that are presented in the embodiment of the present invention. Further, any groove that may deteriorate the appearance of the surfaces of the extruded shape members will not be formed on the surfaces of the extruded shape members. When a side structure is manufactured using the extruded shape members and when the surface of the side structure is subjected to hairline processing without any coating, the appearance of the surface of the side structure can be improved.

Since the milling cutter device and the grinding device each are equipped with the dust-collecting cover, and since chips and powder dust can be collected by a dust collector, operation environment can be prevented from deteriorating.

According to the shape member manufacturing apparatus, a joint projection which is formed when a plurality of shape members are joined together can be cut and ground in a short time with high accuracy.

What is claimed is:

1. A shape member manufacturing apparatus comprising a carrier movable along a joint projection of shape members, and a milling cutter device installed on the carrier for cutting the joint projection of the shape members, wherein a discoid milling cutter of the milling cutter device is formed such that a circumferential milling surface thereof is formed as a convex arc that extends in a direction of the rotation axis of the cutter, and the milling cutter device is installed on the carrier to be movable in an axial direction of the milling cutter, and the milling cutter device also including sliding plates on opposite axial ends of the milling cutter, which sliding plates have contact surfaces for contacting surfaces of the shape members while the milling cutter cuts the joint projection of the shape members, the contact surfaces of the sliding plates being tilted with respect to the rotation axis of the cutter.

2. The shape member manufacturing apparatus according to claim 1, wherein the convex arc milling surface of the milling cutter is formed in a circular arc in the direction of the rotation axis.

3. The shape member manufacturing apparatus according to claim 1, wherein the convex arc milling surface of the milling cutter is formed in a circular arc in the direction of the rotation axis, and wherein the rotation axis of the milling cutter can be tilted at a certain angle with respect to the surfaces of the shape members to be cut.

4. The shape member manufacturing apparatus according to claim 1, wherein the sliding plates are used to keep the cutting depth of the milling cutter constant.

5. The shape member manufacturing apparatus according to claim 1, wherein the milling cutter device is installed in a column that cdnstitutes the carrier, and a grinding device is installed in the column.

* * * * *